United States Patent Office 3,356,764
Patented Dec. 5, 1967

3,356,764
OZONE-RESISTANT BLEND OF A DIENE POLYMER AND AN ETHYLENE-PROPYLENE RUBBER
Anthony V. Gentile, Waterbury, Conn., assignor to Uniroyal, Inc., a corporation of New Jersey
No Drawing. Filed Jan. 24, 1966, Ser. No. 522,363
10 Claims. (Cl. 260—889)

This application is a continuation-in-part of my copending application Ser. No. 348,826, filed Mar. 2, 1964, and now abandoned.

This invention relates to a synergistic ozone-resistant composition comprising (1) conjugated diene polymer rubber, (2) ethylene-propylene copolymer rubber, and (3) poly(trimethyl dihydroquinoline) or 6-ethoxy-1,2-dihydro-2,2,4-trimethyl quinoline.

The invention is based on the unexpected discovery that a composition comprising the three said ingredients has remarkable resistance to attack by ozone. The magnitude of such resistance is far in excess of anything that could be predicted from the known effects of the ingredients themselves. There is a surprising synergistic cooperation between the ingredients when assembled in the present novel combination.

The invention contemplates blending 100 parts (all quantities are expressed herein by weight unless otherwise indicated) of conjugated diene polymer rubber with from 5 to 50 parts of ethylene-propylene copolymer rubber, and from 0.5 to 5 parts of poly(trimethyl dihydroquinoline) or 6-ethoxy-1,2-dihydro-2,2,4-trimethyl quinoline. The ingredients may be mixed in any suitable conventional manner, for example on a rubber mill, and the composition may be fabricated into a desired shape in any suitable conventional manner, such as by calendering, molding, or the like. Useful articles of all sorts may be made from the composition, such as coated fabrics for use as footwear uppers.

The conjugated diene polymer rubber employed may be a homopolymer of such conjugated dienes as butadiene or isoprene (whether a synthetic product such as cis-polybutadiene, emulsion polybutadiene, or cis-polyisoprene, or natural rubber) or a copolymer thereof such as a rubbery copolymer of butadiene with a copolymerizable monoethylenically unsaturated monomer such as styrene, acrylonitrile, or equivalents thereof. Mixtures of such rubbers may be employed, such as a mixture of SBR and natural rubber in any desired ratio (e.g., 5:95, 25:75, 50:50, 75:25, 95:5, etc.).

The ethylene-propylene rubber employed in the invention is preferably the unsaturated, sulfur-vulcanizable kind, such as is made in known manner by copolymerizing ethylene and propylene (or for that matter any two or more alpha-monoolefins) with at least one copolymerizable diene, ordinarily a non-conjugated diene, such as dicyclopentadiene, 1,4-hexadiene, methylene norbornene, 1,5-cyclooctadiene or the like, including the copolymers described in British Patent 880,904, Dunlop Rubber Co., October 25, 1961; U.S. Patents 2,933,480, Gresham and Hunt, April 19, 1960, and 3,000,866, Tarney, Sept. 19, 1961, and Belgian Patents 623,698 and 623,741, Montecatini, Feb. 14, 1963, the disclosures of which are hereby incorporated herein by reference. The dienic component renders the resulting terpolymer unsaturated and vulcanizable with the usual vulcanizing systems for unsaturated rubbers, including those based on sulfur and accelerators of sulfur vulcanization. Less preferred are the saturated ethylene-propylene rubbers which require a peroxide cure. Preferred dienes are dicyclopentadiene, 1,4-hexadiene, and 1,5-cyclooctadiene and methylene norbornene.

The poly(trimethyl dihydroquinoline) employed in the present synergistic composition is a known material, prepared for example by polymerization of 1,2-dihydro-2,2,4-trimethylquinoline as described in the working example of U.S. Patent 2,718,517, Harris, Sept. 20, 1955. The 6-ethoxy-1,2-dihydro-2,2,4-trimethylquinoline which may be employed in place of (or, if desired in addition to) the poly(trimethyl dihydroquinoline) is likewise a known material described for example in U.S. Patent 2,000,039 or 2,748,100.

The composition of the invention may further include any desired conventional compounding ingredients suitable for use with the described rubbers, notably vulcanizing ingredients, especially sulfur or equivalent sulfur curatives, accelerators, and the like, as well as fillers, pigments, plasticizers, processing aids, etc. It will also be understood that the commercial rubbers as supplied by the manufacturer already contain small amounts of antioxident put in at the polymer plant.

EXAMPLE 1

The following stock is prepared:

| Ingredients: | Parts |
|---|---|
| Natural rubber (No. 1 smoked sheets) | 80.68 |
| EPDM | 10.20 |
| SBR 1018 | 9.12 |
| Agerite Resin D | 4.00 |
| Semi-reinforcing furnace black | 9.12 |
| Whiting (calcium carbonate, natural) | 37.57 |
| Zinc oxide | 3.47 |
| Wax | .50 |
| N-phenyl-N'-cyclohexyl-para-phenylene diamine | .41 |
| Phthalic anhydride | .16 |
| 2-benzothiazyl disulfide | .69 |
| Tri(nonyl phenyl) phosphite | .09 |
| Chlorinated paraffin | .21 |
| Sulfur | 1.60 |

In the above stock, EPDM is an unsaturated rubbery terpolymer of 41% ethylene, 55% propylene, and 4% 1,4-hexadiene. Agerite Resin D is poly(trimethyl dihydroquinoline).

The rubbers, Agerite Resin D and carbon black, in that order, may be blended together in a Banbury mixer for 5 minutes at low speed. The remaining ingredients may then be mixed in with the exception of the sulfur. The batch may be discharged from the mixer and cooled. The cooled batch may then be returned to the mixer, sulfur added, and blended at low speeds to make the final mix. The stock may be calendered, for example at a temperature of 210° F. to 235° F., onto fabric and used to make uppers for boots. The stock may be vulcanized under conventional conditions, e.g., 2½ hours at 270° F. It will be apparent to those skilled in the art that many variations may be made in the foregoing example.

In order to demonstrate the synergism obtained by use in the invention, four different stocks were prepared as follows:

(1) Similar to Example 1, but containing 2 parts of Agerite Resin D and no EPDM.

(2) Similar to Example 1, but containing no EPDM (contains 4 parts Agerite Resin D).
(3) Similar to Example 1, but containing no Agerite Resin D (contains 10 parts EPDM).
(4) Similar to Example 1 (4 parts Agerite Resin D, 10 parts EPDM).

All four stocks, in the cured state, were subjected to an especially severe ozone-resistance test by exposure in an ozonometer to 50 parts per million of ozone at 100° F. with the following results:

| Stock | Condition | Degree of cracking |
|---|---|---|
| 1 | Fails after 2 hrs. 40 mins. of exposure | *1–100 |
| 2 | ----do---- | 1–80 |
| 3 | ----do---- | 1–20 |
| 4 | No crack after 100 hrs | |

*The first figure is the number of cracks, the second figure is the percent of the surface across which the crack extends.

It will be seen that the combination of EPDM and Agerite Resin D (Stock 4, the invention) produces in the natural rubber/SBR mix a result not obtainable by adding EPDM itself or Agerite Resin D itself to the natural rubber/SBR mix. The invention also shows excellent results in outdoor cracking testing.

A particularly advantageous feature of the invention resides in the fact that remarkable ozone protection is achieved without resorting to the use of antiozonant amounts of staining chemicals such as the phenylene diamine types, e.g., N-phenyl-N'-isopropyl-p-phenylene diamine, N,N'-bis(1-methyl-heptyl)-p-phenylene diamine, N,N'-bis(1,4-dimethyl-pentyl) - p - phenylene diamine or N,N'-bis(1-ethyl-3-methyl-pentyl)-p-phenylene diamine.

EXAMPLE 2

The following basic footwear compound is employed:

Ingredients: Parts by weight
- Natural rubber — 80
- SBR — 20
- EPDM — 10 [1]
- Antioxidant (as indicated) — 4 [1]
- Carbon black — 10
- Whiting — 37.5
- Zinc oxide — 3.5
- Wax — 0.5
- N - phenyl - N' - cyclohexyl paraphenylene diamine — 0.4
- Phthalic anhydride — 0.2
- Tri(nonyl phenyl) phosphite — 0.1
- Chrorinated paraffin — 0.2
- 2-benzothiazyl sulfide — 0.7
- Sulfur — 1.7

[1] Where indicated.

The EPDM employed is an unsaturated sulfur-vulcanizable terpolymer containing about 60% ethylene, about 35% propylene, and about 5% dicyclo pentadiene. Two series of stocks (Series A and Series B) are prepared, in one of which there is no EPDM (Series A) and the other of which includes 10 parts of EPDM (Series B). All the stocks were cured for 1 hour at 292° F. In each series various types of antioxidants or antiozonants were evaluated, as indicated in the following tables, in an ozone box (50 p.p.h.m./100° F.) and in outdoor exposure at Naugatuck, Connecticut, with the results shown.

TABLE I

[Hours to crack in ozone box at 50 p.p.h.m./100° F. in footwear compound]

| Antioxidant | Series A NR-SBR Compound | Series B NR-SBR Compound plus 10 parts EPRD |
|---|---|---|
| 1. None (blank) | 7 | 13 |
| 2. Agerite Resin D | 9 | (¹) |
| 3. Octamine | 16 | 16 |
| 4. Aminox | 16 | 11 |
| 5. Betanox special | 11 | 16 |
| 6. Flexamine | 5 | 16 |
| 7. Naugawhite | 7 | 56 |
| 8. 2246 | 11 | 13 |
| 9. Santoflex AW | 80 | (¹) |
| 10. Santoflex Crystals | 5 | 16 |

¹ OK after 272 hrs.

In Table I, the invention is represented by stocks No. 2 and No. 9 of Series B, that is, the stocks containing EPDM and Agerite Resin D (poly(1,2-dihydro-2,2,4-trimethylquinoline)) or Santoflex AW (6-ethoxy-1,2-dihydro-2,2,4-trimethyl quinoline. The other antioxidants of antiozonants, which were included for purposes of comparison, are identified as follows:

Octamine—reaction product of diisobutylene and diphenylamine.

Aminox—low temperature reaction product of diphenylamine and acetone.

Betanox special—low temperature reaction product of phenyl beta naphthylamine and acetone.

Flexamine—65% complex diarylamine-ketone reaction product and 35% N,N'-diphenyl-p-phenylamine diamine.

Naugawhite—alkylated bis phenol.

2246—2,2' - methylene bis(4 - methyl - 5 - tert-butyl phenol).

Santowhite Crystals—4,4' - thio bis(6 - tert - butyl m-cresol).

TABLE II

[Days to crack outdoors at Naugatuck in footwear compound]

| Antioxidant | Series A NR-SBR Compound | Series B NR-SBR Compound plus 10 parts EPRD |
|---|---|---|
| 1. None (blank) | 5 | 5 |
| 2. Agerite Resin D | 11 | (¹) |
| 3. Octamine | 5 | 5 |
| 4. Aminox | 5 | 7 |
| 5. Betanox special | 5 | 19 |
| 6. Flexamine | 13 | 56 |
| 7. Naugawhite | 5 | 11 |
| 8. Santoflex AW | 41 | (²) |
| 9. 2246 | 5 | 11 |
| 10. Santowhite Crystals | 5 | 16 |

¹ OK after 104 days.
² VVS after 104 days (some cracking).

In Table II, the invention is represented by stocks No. 2 and No. 8 of Series B.

The invention is applicable to various other stocks besides footwear stocks, such as SBR-high abrasion furnace black compounds, automotive tire tread stocks and sidewall stocks, bicycle tire compounds, etc.

Having thus described my invention, what I claim and desire to protect by Letters Patent is:

1. An ozone-resistant composition comprising a vulcanized mixture of
   (1) 100 parts of a conjugated diene polymer rubber
   (2) 5 to 50 parts of ethylene-propylene rubber, and
   (3) 0.5 to 5 parts of a substance selected from the group consisting of poly(1,2-dihydro-2,2,4-trimethylquinoline) and 6-ethoxy-1,2-dihydro-2,2,4-trimethyl quinoline.

2. A composition as in claim 1 in which the conjugated diene polymer rubber is natural rubber, SBR rubber, or a mixture thereof.

3. A composition as in claim 1 in which the ethylene-propylene rubber is an unsaturated terpolymer of ethylene, propylene and a copolymerizable non-conjugated diene.

4. A composition as in claim 3 in which the non-conjugated diene polymer rubber is selected from natural rub- cyclopentadiene, 1,4-hexadiene, 1,5-cyclooctadiene and methylene norbornene.

5. A sulfur vulcanized composition as in claim 3.

6. A composition as in claim 5 in which the conjugated diene polymer rubber is selected from natural rubber, SBR rubber, or a mixture thereof.

7. A composition as in claim 5 in which the conjugated diene polymer rubber is SBR rubber.

8. A composition as in claim 5 in which the conjugated diene polymer rubber is SBR rubber and the non-conjugated diene is dicyclopentadiene.

9. A composition as in claim 1 in which the conjugated diene polymer rubber is SBR rubber, the ethylene-propylene rubber is an unsaturated terpolymer of ethylene, propylene and dicyclopentadiene, the substance (3) is poly(1,2-dihydro-2,2,4-trimethylquinoline), and the composition is sulfur-vulcanized.

10. A composition as in claim 1 in which the conjugated diene polymer rubber is SBR rubber, the ethylene-propylene rubber is an unsaturated terpolymer of ethylene, propylene and dicyclopentadiene, the substance (3) is 6-ethoxy - 1,2 - dihydro - 2,2,4-trimethyl quinoline, and the composition is sulfur-vulcanized.

References Cited
UNITED STATES PATENTS

| | | | |
|---|---|---|---|
| 2,290,561 | 7/1942 | Ingram | 260—800 |
| 2,511,063 | 6/1950 | Ingram | 260—45.8 |
| 2,748,100 | 5/1956 | Harris et al. | 260—45.8 |
| 2,933,480 | 4/1960 | Gresham et al. | 260—80.5 |
| 3,179,718 | 4/1965 | Wei et al. | 260—889 |
| 3,224,985 | 12/1965 | Gladding et al. | 260—5 |

SAMUEL H. BLECH, *Primary Examiner.*

MURRAY TILLMAN, *Examiner*

G. F. LESMES, *Assistant Examiner.*

UNITED STATES PATENT OFFICE
CERTIFICATE OF CORRECTION

Patent No. 3,356,764　　　　　　　　　　　　December 5, 1967

Anthony V. Gentile

It is hereby certified that error appears in the above numbered patent requiring correction and that the said Letters Patent should read as corrected below.

Column 5, lines 8 and 9, for "diene polymer rubber is selected from natural rub-cyclopentadiene" read -- diene is selected from the group consisting of dicyclopentadiene --.

Signed and sealed this 29th day of April 1969.

(SEAL)

Attest:

Edward M. Fletcher, Jr.　　　　　　　　　　　EDWARD J. BRENNER
Attesting Officer　　　　　　　　　　　　　　Commissioner of Patents